Patented June 2, 1942

2,284,619

UNITED STATES PATENT OFFICE 2,284,619

WELDING FLUX

Perez Epstein, Philadelphia, Pa.

No Drawing. Application September 14, 1939,
Serial No. 294,854

1 Claim. (Cl. 148—26)

My invention relates to uniting copper and relates particularly to a welding flux.

Heretofore, pieces of copper have been welded together by the use of a welding rod and welding flux, but the welded joints have not been able to withstand the required tensional stress, ductility, and elongation. Attempts have been made to improve the welding as well as the soldering flux to withstand the strains imposed thereon, but such attempts have been mainly futile.

A welding rod or "melt stick" for welding copper joints having the following elements produces an excellent weld, to wit: copper 98.83%; silver 1.12%; and phosphorus 0.05%. These percentages may be varied slightly, but for the best results the above proportions should be used. A joint made by using the aforementioned welding rod has the desired ductility, elongation and tensile strength.

However, in welding, it is essential to use a flux and a welding rod, each of which usually is separate and distinct from one another. The rod supplies the necessary material to the union while the flux aids in the uniting of the metals. The flux may be held within the center of a cylindrical hollow welding rod and by so combining the flux and rod I have a single unitary welding rod and flux. This single unit facilitates the application of the flux and the additional metal to the joint and eliminates the handling of two separate articles, (1) the welding rod, and (2) the welding flux.

As the result of considerable research and exhaustive tests, I have discovered that welding paste or flux having the following ingredients in the proportions as declared produces a very strong, uniform, solid joint.

| | Percent by weight |
|---|---|
| Borax | 36 |
| Sodium acid fluoride | 23 |
| Sodium silico fluoride | 19 |
| Antimony fluoride | 1 |
| Phosphoric acid | 13 |
| Tri-sodium phosphate | 8 |
| | 100 |

When the above ingredients are mixed together, they form a paste. They remain together as a heterogeneous mixture and not as a chemical combination.

However, when heat is applied to the copper joint and the combined welding rod and welding flux, a chemical reaction occurs between the solder and the flux resulting in a welding or integral uniting of the surfaces or margins of the copper members with the result that a very strong joint is effected. The chemical reaction which occurs is that the phosphorus serves as a deoxidizing agent, whereas the fluoride serves as a buffer solution and the fluoride also serves to absorb the chemical element hydrogen from the acetylene, a gas used to supply heat. The phosphate serves as a cleansing agent to dissolve grease or other such impurities, particularly cuprous oxide.

Although I have disclosed that the welding rod and flux are formed together, nevertheless, there may be circumstances where the welding flux itself, in the hereinbefore proportions, may be used with a separate welding rod.

The heat application to weld may be from any source, such as acetylene-oxygen, torch, from gases such as propane-oxygen, butane oxygen, hydrogen, thermit welding, spot welding, and electric arc welding. The temperature reached in electric arc welding is about 7000° F.

I claim as my invention:

A flux for welding copper comprising a heterogeneous mixture of borax 36% by weight, sodium acid fluoride 23% by weight, sodium silico fluoride 19% by weight, antimony fluoride 1% by weight, phosphoric acid 13% by weight, and trisodium phosphate 8% by weight.

PEREZ EPSTEIN.